(12) United States Patent
Bonnin Pons-Estel

(10) Patent No.: US 11,406,002 B2
(45) Date of Patent: Aug. 2, 2022

(54) BUILDING AUTOMATION DEVICE

(71) Applicant: ROBOT, S.A., Palma de Mallorca (ES)

(72) Inventor: Bernat Bonnin Pons-Estel, Palma de Mallorca (ES)

(73) Assignee: ROBOT, S.A., Palma de Mallorca (ES)

(*) Notice: Subject to any disclaimer, the term of this patent is extended or adjusted under 35 U.S.C. 154(b) by 342 days.

(21) Appl. No.: 16/638,774

(22) PCT Filed: May 16, 2018

(86) PCT No.: PCT/ES2018/070357
§ 371 (c)(1),
(2) Date: Feb. 13, 2020

(87) PCT Pub. No.: WO2019/219987
PCT Pub. Date: Nov. 21, 2019

(65) Prior Publication Data
US 2021/0136898 A1    May 6, 2021

(51) Int. Cl.
*H05B 47/18* (2020.01)

(52) U.S. Cl.
CPC ..... *H05B 47/18* (2020.01); *G05B 2219/2614* (2013.01); *G05B 2219/2642* (2013.01); *G05B 2219/2664* (2013.01)

(58) Field of Classification Search
CPC .............. H05B 47/10; H05B 47/18; G05G 2219/2613; G05G 2219/2614; G05G 2219/2642; G05G 2219/2664
See application file for complete search history.

(56) References Cited

U.S. PATENT DOCUMENTS 10,186,821 B2 * 1/2019 Müller ............... H01R 12/722
2008/0244104 A1   10/2008 Clemente
(Continued)

FOREIGN PATENT DOCUMENTS

EP    2276395 A2    1/2011
ES     407792 A3    11/1975
(Continued)

OTHER PUBLICATIONS

Feb. 1, 2019 (WO) International Search Report—App. PCT/ES2018/070357.
(Continued)

*Primary Examiner* — Jimmy T Vu
(74) *Attorney, Agent, or Firm* — Banner & Witcoff, Ltd.

(57) ABSTRACT

The invention relates to a building automation device adaptable to space and communication requirements, comprising a communications module having a communications bus, an application module which implements the functionality, a bus connector for supplying power and data between the two modules, the communications module comprising a first casing having a first wall from which pins of the connector bus project, and a second wall with a first recess in which the communications bus is inserted, the application module comprising a second casing having a third wall from which a pin receiver projects, and a fourth wall having a second recess including electrical connection terminals, wherein, when the ten pins of the bus connector are introduced in their receiver, the first wall is positioned next to the third wall and the first casing is joined to the second casing by securing means.

4 Claims, 4 Drawing Sheets

(56) References Cited

U.S. PATENT DOCUMENTS

2013/0066514 A1* 3/2013 Das .................. G07C 5/008
701/31.5
2016/0191268 A1   6/2016 Diebel

FOREIGN PATENT DOCUMENTS

| IT | CS20100021 A1 | 6/2012 |
|---|---|---|
| WO | 2008097992 A1 | 8/2008 |
| WO | 2015195202 A2 | 12/2015 |
| WO | 2016154461 A1 | 9/2016 |

OTHER PUBLICATIONS

Han Ning et al. "Research of KNX device node and development based on the bus interface module" Proceedings of the 29th Chinese Control Conference, Jul. 2010, pp. 4345-4350.
Jan. 22, 2021 (EP) Extended European Search Report—App. 18918528.3.

\* cited by examiner

BUILDING AUTOMATION DEVICE

The present application is a U.S. National Phase Application under 35 U.S.C. § 371 of PCT/ES2018/070357 filed May 16, 2018, the contents therein of the applications is incorporated by reference herein in its entirety.

FIELD OF THE INVENTION

The present invention is encompassed in the field of building automation devices, such as for example those that control lighting, blinds, air conditioning, etc.

BACKGROUND OF THE INVENTION

Currently, the use of home automation and building management systems is being extended for building automation, which is done through devices with mainly electrical and electronic elements that allow the automation of certain tasks, such as lighting control, shutter control—such as the raising and lowering of blinds—the control of ambient air by means of air conditioning and heating appliances, surveillance, doorbells, etc. However, the implementation of this automation has led to the installation of many devices, which have a certain size and certain specific operating requirements, which sometimes makes them unfeasible due to their low ability to adapt to new communications, electrical and electronic requirements, like to certain relatively low-volume spaces, such as a low ceiling.

Patent WO2008/097992A1 is known which explains a building automation system with modular components, which in one embodiment are of the type of attachment to a standard rail with the aim of making the system more compact, avoiding the extensive use of wiring. Advantageously, each modular component can be of the same height to be arranged laterally overlapping occupying the length of the rail, in which a power bus and a data bus can be arranged, either separately or combined. It is cited that any communication protocol can be used, specifically using a modular component intended for communications.

Patent US2008/0244104A1 is known, which explains a building automation system comprising a communications adapter with the various system devices, the adapter includes a fieldbus, can operate under several protocols. The schematic configuration of the adapter and device is explained, without reflecting a specific configuration.

Patent US2016/0191268A1 is known, which explains a building automation system with devices that include functional interchangeable modules, these are configured as portions insertable from the front of each device, some modules can be communications modules including different protocols. In the configurations shown, a fuse box and a light bulb socket are included.

DESCRIPTION OF THE INVENTION

The present invention is defined and characterised by the independent claims, while the dependent claims describe additional features thereof.

The subject matter of the invention is a building automation device that adapts to the different space and communications requirements. The technical problem to solve is to configure said device to reach the mentioned object.

In view of the foregoing, the present invention relates to a building automation device comprising a communication module (also called "MCU") having a communications bus of the device, being understood as with its exterior, either through wired or wireless network, an application module (also called "MAU") that implements the functionality of the device, i.e., it carries out the functions of the device, if it is a light switch, it will turn the lights on and off, etc., and a bus connector between the two modules, as is known in the state of the art.

The device is characterised in that the bus connector is at the same time power supply and data transfer, the communication module comprising a first casing with a first wall from which at least ten pins of the bus connector project, a second wall having a first recess in which the communications bus is inserted, the application module comprising a second casing with a third wall from which a receiving connector for the bus connector pins projects, a fourth wall having a second recess that includes electrical connection terminals, in use when the ten pins of the bus connector are introduced in the receiving connector, the first wall is positioned next to the third wall and the first casing is joined to the second casing by securing means.

In this way, a compact device adaptable to any space and also adaptable to any communications environment is achieved by simply placing the appropriate communications bus, i.e., that of the protocol necessary for the specific application. In this way a single MAU can be maintained for different applications in which the communication protocol changes, usually when changing countries, whereby only the MCU needs to be changed, with the economic and installation-related advantage that this implies. Likewise, this can be used for maintenance work in which a user does not have to be deprived of the device for a long period of time due to breakdown of the power stage or electrical maneuver, since merely the MAU is to be changed, which entails only a few seconds, avoiding bus reconnection and probably reconfiguration of the device.

Another added advantage is that it allows the development of the functionalities of the devices to be independent from that of communication, by having the MAU separated from the MCU, speeding up the development of new devices or the updating of existing ones.

Another advantage is that it allows the implementation of homogeneous multiprotocol solutions.

Another advantage is that in the updating of existing installations it allows the devices of the invention to be placed gradually, being able to coexist with old devices and even with those of different manufacturers.

BRIEF DESCRIPTION OF THE DRAWINGS

The present specification is completed by a set of figures that illustrate a preferred embodiment and in no way limit the invention.

DETAILED DESCRIPTION OF THE INVENTION

Figure 1:
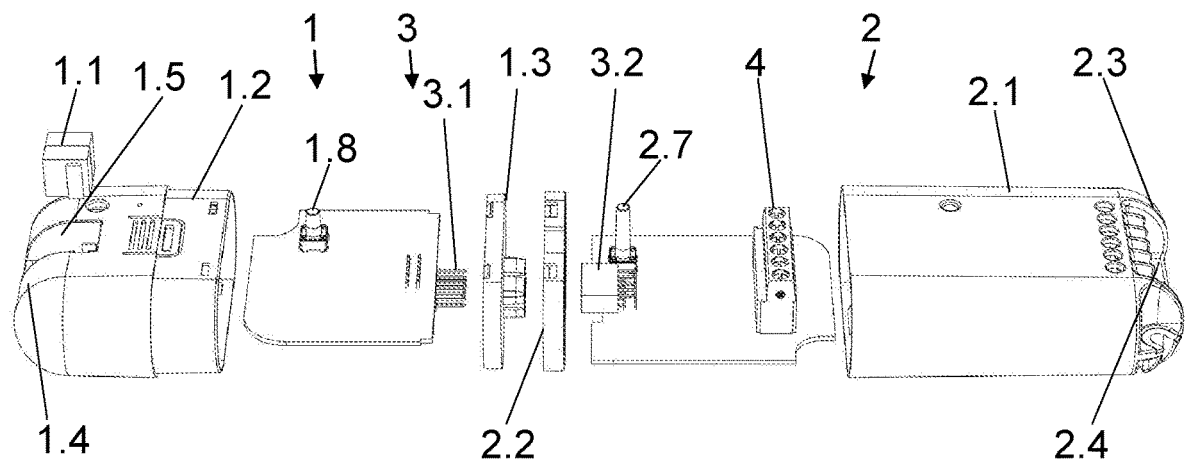
FIG. 1 represents an exploded perspective of the device.
Figure 2:
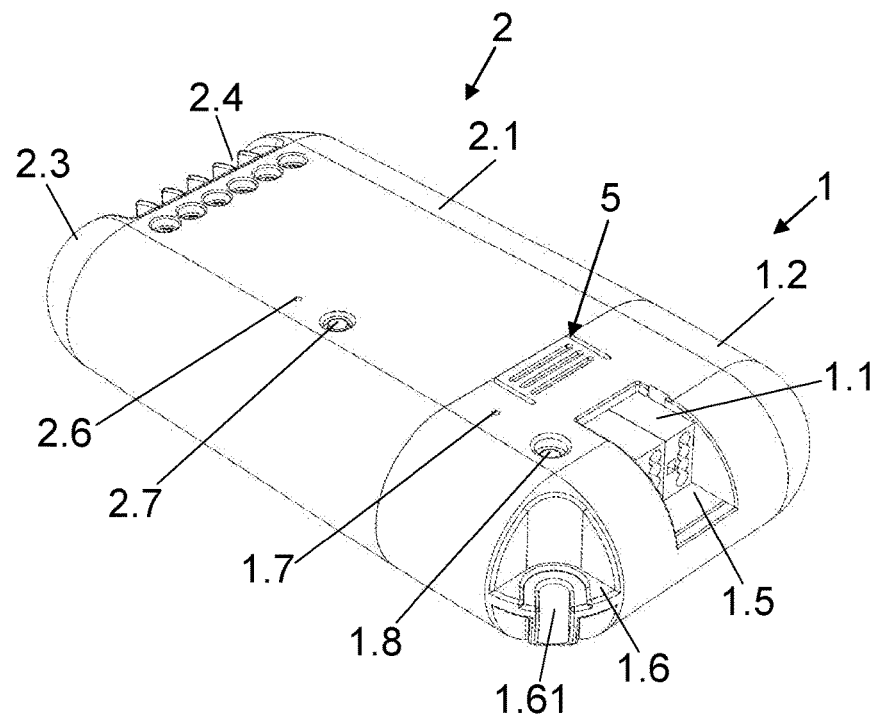
FIG. 2 represents a perspective view of the closed device, in use.

The present invention is a building automation device, shown in an exploded view in FIG. 1 and assembled or in use in FIG. 2, comprising a communication module (1) with a communications bus (1.1) of the device, an application module (2) that implements the functionality of the device, and a bus connector (3) between the two modules (1,2), the bus connector (3) being for power supply and data transfer.

Figure 3:
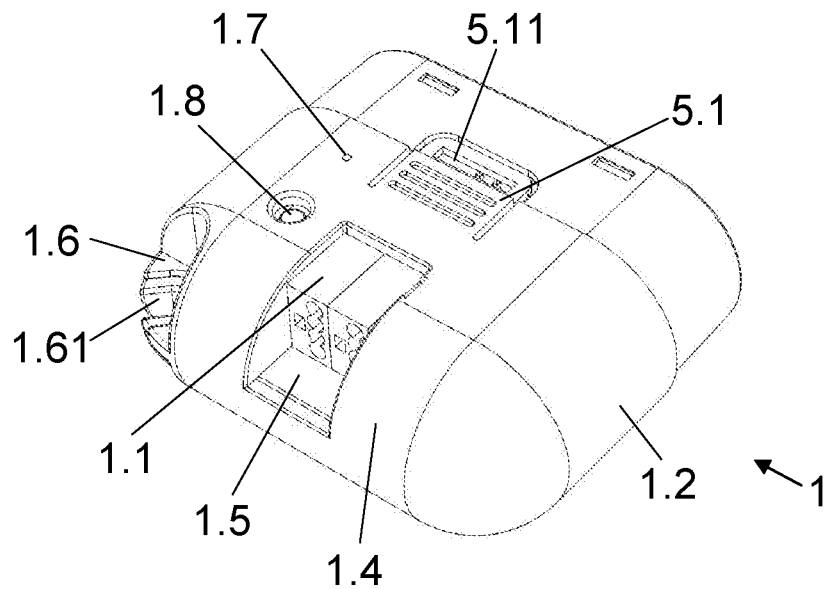
FIG. 3 represents a rear perspective view of the first casing.
Figure 4:
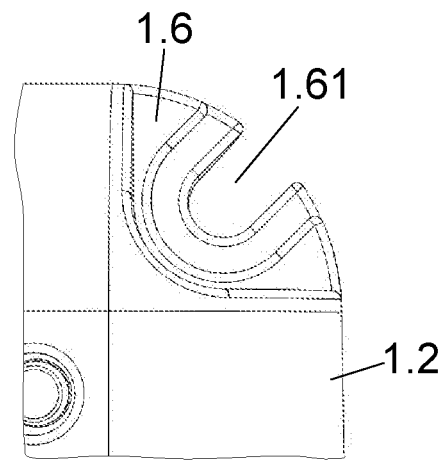
FIG. 4 represents a plan view of a corner of the first casing.
Figure 5:
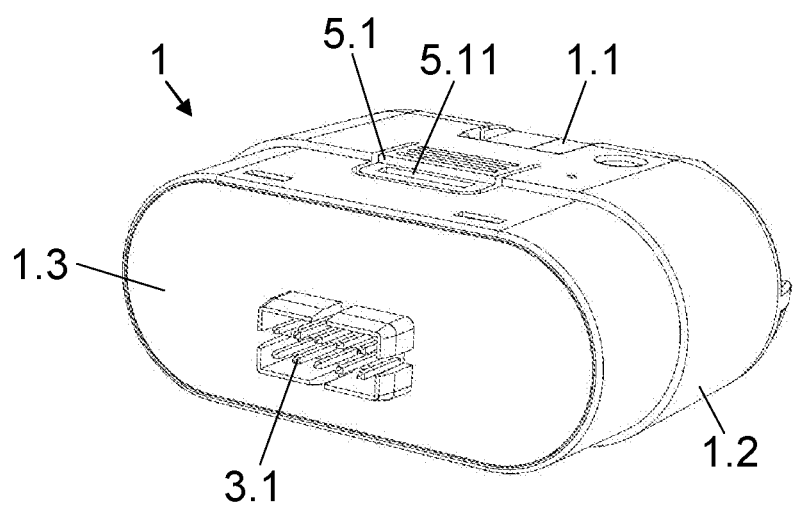
FIG. 5 represents a front perspective view of the first casing.
Figure 12:
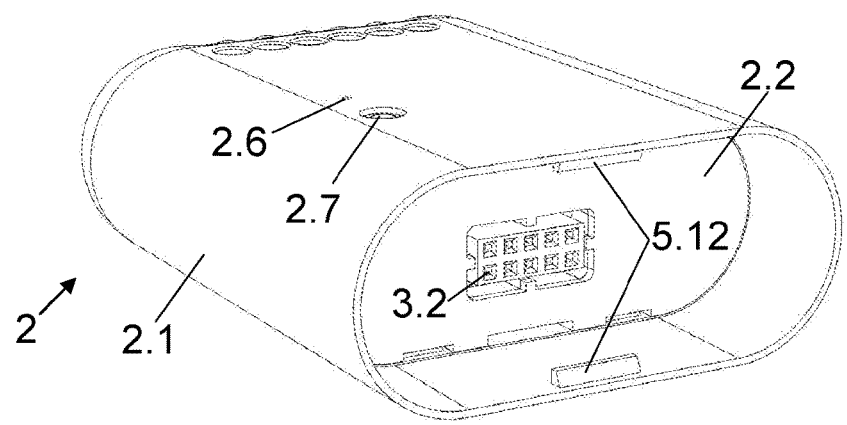
FIG. 12 represents a front perspective view of the second casing.

The communication module (1) comprises a first casing (1.2), as shown in FIGS. 1 to 5, with a first wall (1.3) from which at least ten pins (3.1) of the bus connector (3) project, FIGS. 1 and 5, a second wall (1.4) having a first recess (1.5) in which the communications bus (1.1) is inserted, FIGS. 1, 2 and 3, the application module (2) comprising a second casing (2.1), as shown in FIGS. 1, 2, 10 and 12, with a third wall (2.2) from which a receiving connector (3.2) for the bus connector pins (3) projects, FIGS. 1 and 12, a fourth wall (2.3) having a second recess (2.4), FIGS. 1 and 2, which includes electrical connection terminals (4), FIG. 1.

In use, FIG. 2, when the ten pins (3.1) of the bus connector (3) are introduced in the receiving connector (3.2) the first wall (1.3) is positioned next to the third wall (2.2) and the first casing (1.2) is joined to the second casing (2.1) by securing means (5).

A detail of the embodiment explained is that the securing means (5) are at least one tab (5.1), two in the embodiment explained, arranged in the first casing (1.2) with a hollow (5.11), FIGS. 3 and 5, which engage, each one, on a protuberance (5.12) arranged in the second casing (2.1), FIG. 12. This creates a simple and non-permanent attachment, usually two securing means (5) are placed on opposite faces so that the tabs (5.1) can be pressed with the thumb and index finger of one hand.

Figure 11:
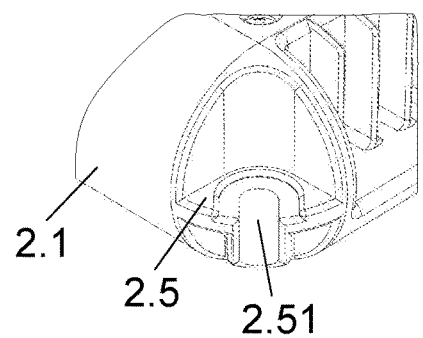
FIG. 11 represents a perspective view of a corner of the second casing.

Another detail of the embodiment explained is that the first casing (1.2) has a first flat surface (1.6) with a first opening (1.61), FIG. 4, and the second casing (2.1) having a second flat surface (2.5) with a second opening (2.51), FIG. 11. This allows the device to be anchored inside a junction box, on a board or any flat surface by means of a flat head screw, for example. Preferably and as shown in the embodiment, the openings (1.61,2.51) are arranged diagonally opposite so as to prevent the device from shifting, with a minimum of two.

Figure 10:
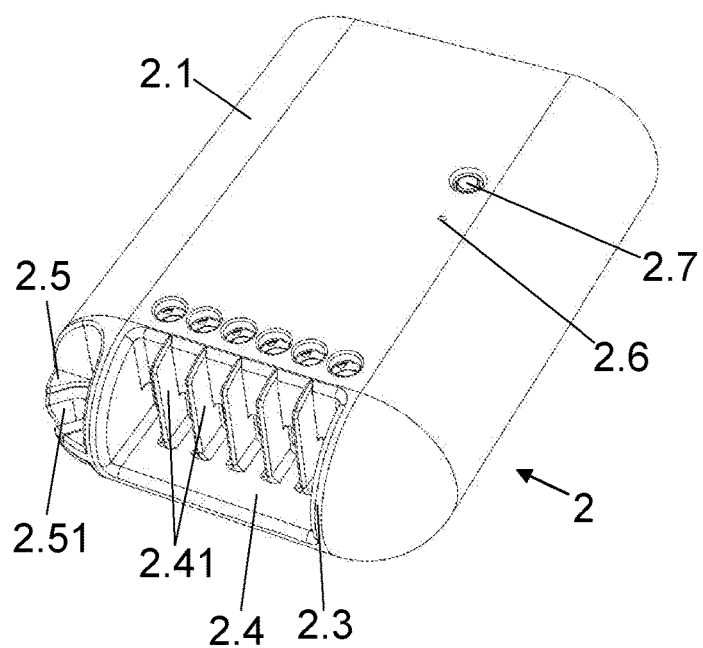
FIG. 10 represents a rear perspective view of the second casing.

Another detail of the explained embodiment is that the second casing (2.1) has a partition wall (2.41) between each pair of terminals (4), or connections to the terminal, whereby each one creates a cavity in the casing (2.1), as depicted, FIG. 10. These walls (2.41) or flaps prevent short circuits produced during the introduction of the different wires in the terminal due to some wire strand not properly entering the terminal cavity.

As can be seen in the explained embodiment, the outer contour of the device has no edges, but an organic shape that facilitates the introduction into the holes of the false ceilings and prevents scratches that occur on the ceiling during installation.

Another advantageous detail of the embodiment shown is that the first casing (1.2) of the communication module (1) has a lip, not referenced in the figures, by way of a male which is inserted into the second casing (2.1) of the application module (2), which facilitates closing the device and makes it more solid.

Preferably, the communication module (1) has a first LED indicator (1.7) and a first push-button (1.8), which allow the user to interact and parameterise some functions of the device, FIGS. 2 and 3. Similarly, the application module (2) also has a second LED indicator (2.6) and a second push-button (2.7), FIGS. 2 and 10.

Figure 6:
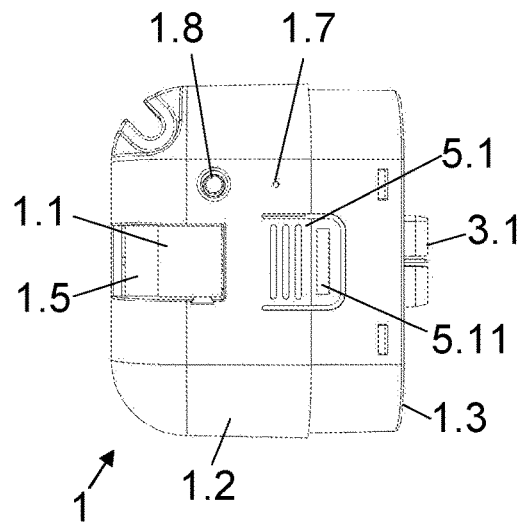
FIGS. 6 to 8 represent plan views of the first casing with different communication buses.
Figure 7:
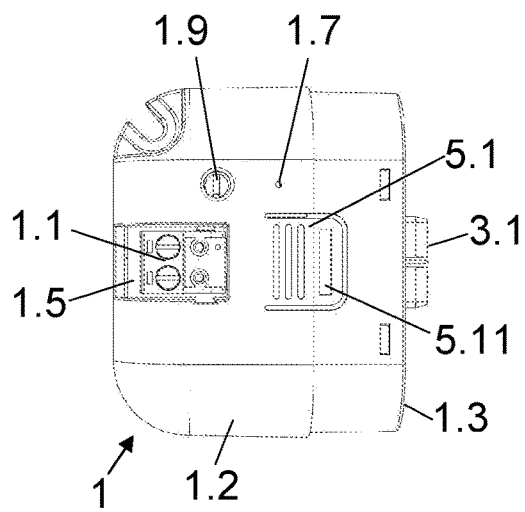
Figure 8:
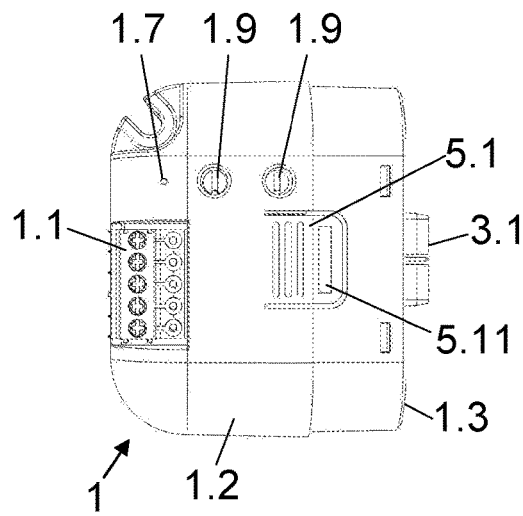
Figure 9:
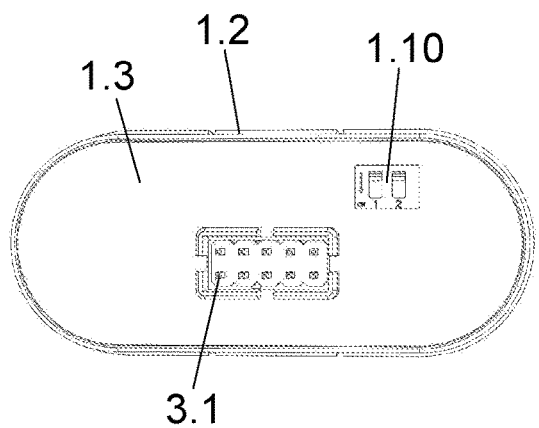
FIG. 9 is a front view of the first casing of the embodiment of FIG. 8.

Advantageously, the first recess (1.5) is adapted for receiving the communications bus (1.1) according to one of the protocols selected from among KNX, C3, C4 and BACnet as shown respectively in FIGS. 6 to 8.

Specifically, for KNX and C3/C4, FIGS. 6 and 7, the same first recess (1.5) serves the purpose. For KNX, FIG. 6, the first programming push-button (1.8) and the first status LED indicator (1.7) are incorporated as a user interface, while for C3/C4, FIG. 7, a rotary selector (1.9) is incorporated for address assignment and a status LED.

On the other hand, for BACnet, FIG. 8, the first recess (1.5) is larger than the previous one, since it goes to five terminals from two. This is due to the insurmountable differences that exist in terms of the user interface. The configuration for BACnet incorporates two rotary selectors (1.9) for address assignment, the first status LED indicator (1.7), and a "DIP switch"-type double selector (1.10) with which to adjust the transmission speed.

The invention claimed is:

1. A building automation device comprising a communication module having a communications bus of the device, an application module that implements the functionality of the device, and a bus connector between the two modules, wherein said bus connector is for power supply and data transfer, the communication module comprising a first casing with a first wall from which at least ten pins of the bus connector project, a second wall having a first recess in which the communication bus is inserted, the application module comprising a second casing with a third wall from which a receiving connector for the bus connector pins projects, a fourth wall having a second recess that includes electrical connection terminals, in use when the ten pins of the bus connector are introduced in the receiving connector, the first wall is positioned next to the third wall and the first casing is joined to the second casing by securing means.

2. The device according to claim 1, wherein the securing means are at least one tab arranged in the first casing with a hollow that engages on a protuberance arranged in the second casing.

3. The device according to claim 1, wherein the first casing has a first flat surface with a first opening and the second casing has a second flat surface with a second opening.

4. The device according to claim 1, wherein the second casing has a partition wall between each pair of terminals.

* * * * *